United States Patent
Kalaboukis et al.

(10) Patent No.: US 11,610,203 B2
(45) Date of Patent: Mar. 21, 2023

(54) VALUE TRANSFER VIA FACIAL RECOGNITION

(71) Applicant: Wells Fargo Bank, N.A., San Francisco, CA (US)

(72) Inventors: Chris Kalaboukis, San Jose, CA (US); Kristine Ing Kushner, Orinda, CA (US); Muhammad Farukh Munir, Pittsburg, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 641 days.

(21) Appl. No.: 16/155,452

(22) Filed: Oct. 9, 2018

(65) Prior Publication Data

US 2020/0111103 A1    Apr. 9, 2020

(51) Int. Cl.
*G06Q 20/40*    (2012.01)
*G06Q 20/32*    (2012.01)

(52) U.S. Cl.
CPC ... *G06Q 20/40145* (2013.01); *G06Q 20/3223* (2013.01); *G06Q 20/3224* (2013.01)

(58) Field of Classification Search
CPC .............................................. G06Q 20/40145
See application file for complete search history.

(56) References Cited

U.S. PATENT DOCUMENTS

| | | | |
|---|---|---|---|
| 7,664,703 B2 | 2/2010 | Hansen et al. | |
| 9,076,171 B2 | 7/2015 | Cooley et al. | |
| 9,747,587 B2 | 8/2017 | Diehl | |
| 2003/0149724 A1* | 8/2003 | Chang | H04L 12/1822 709/204 |
| 2012/0158582 A1 | 6/2012 | Nuzzi | |
| 2013/0036017 A1 | 2/2013 | Galloway | |
| 2013/0218757 A1 | 8/2013 | Ramanathan et al. | |
| 2014/0089195 A1 | 3/2014 | Ward et al. | |
| 2014/0123043 A1* | 5/2014 | Schmidt | G06F 3/04883 715/769 |
| 2014/0214652 A1 | 7/2014 | Zheng et al. | |
| 2015/0348045 A1 | 12/2015 | Agarwal et al. | |
| 2016/0125383 A1 | 5/2016 | Chan et al. | |
| 2016/0253651 A1* | 9/2016 | Park | G06Q 20/34 705/39 |
| 2017/0228584 A1* | 8/2017 | Studnicka | H04W 76/14 |
| 2018/0096321 A1* | 4/2018 | Haldenby | G06Q 30/04 |
| 2019/0080303 A1* | 3/2019 | Nair | G06F 1/1694 |
| 2019/0197102 A1* | 6/2019 | Lerner | G06F 3/04817 |
| 2019/0339855 A1* | 11/2019 | Walkin | G06F 3/0485 |

* cited by examiner

*Primary Examiner* — Jay Huang
(74) *Attorney, Agent, or Firm* — Foley & Lardner LLP

(57) ABSTRACT

A user device includes a touchscreen, a camera, and a client application. The client application is structured to provide a first view of a first user through a first camera input of the camera device, a first user image displayed on the display, provide a second view of a second user through a second camera input of the camera device, a second user image displayed on the display, receive a transaction amount, detect a slide of a user input member from the first user image to the second user image displayed on the touchscreen, and in response to detecting the slide of the user input member from the first user image to the second user image on the touchscreen, initiate a transfer of funds from a first user account associated with the first user to a second user account associated with the second user equal to the transaction amount.

20 Claims, 8 Drawing Sheets

VALUE TRANSFER VIA FACIAL RECOGNITION

TECHNICAL FIELD

The present disclosure relates generally to the field of transactions using a mobile device.

BACKGROUND

When an individual desires to transfer money to another individual or to an entity, the individual is generally required to manually input a payment or transfer amount, input the recipient's information, including account information or identity information (e.g., an email address, phone number, etc.). Many times, the individual may not have such information readily available. In addition when an individual desires to make a payment to a merchant, the individual must present a payment device, such as a debit card or credit card to the merchant and wait for the merchant to swipe or otherwise input the payment device information. Furthermore, if desiring to split a bill payment between multiple individuals, the individuals must all present separate payment devices to the merchant. In some cases, some individuals may forget or lose a payment device and be unable to make a payment when necessary.

SUMMARY

One implementation of the present disclosure is a method. The method includes viewing a first user through a first camera input of a two-way camera device, a first user image displayed on a display of a user device, viewing a second user through a second camera input of the two-way camera device, a second user image displayed on the display of the user device, receiving a transaction amount input, detecting a slide of a user input member from the first user image to the second user image displayed on the display, and in response to detecting the slide of the user input member from the first user image to the second user image, initiating a transfer of funds from a first user account associated with the first user to a second user account associated with the second user equal to the transaction amount input.

Another implementation of the present disclosure is a method. The method includes viewing a user through a first camera input of a two-way camera device, a user image displayed on a display of a user device, viewing an object associated with a third party through a second camera input of the two-way camera device, an object image displayed on the display of the user device, determining third party information from the object image, determining a payment amount, detecting a slide of a user input member from the user image to the object image displayed on the display, and in response to detecting the slide of the user input member from the user image to the object image, initiating a payment from the user account to the third party equal to the payment amount.

Another implementation of the present disclosure is a user device. The user device includes a touchscreen including a display, a two-way camera, and an application circuit. The client application is structured to provide a first view of a first user through a first camera input of the two-way camera device, a first user image displayed on the display, provide a second view of a second user through a second camera input of the two-way camera device, a second user image displayed on the display, receive a transaction amount input, detect a slide of a user input member from the first user image to the second user image displayed on the touchscreen, and in response to detecting the slide of the user input member from the first user image to the second user image on the touchscreen, initiate a transfer of funds from a first user account associated with the first user to a second user account associated with the second user equal to the transaction amount input.

Another implementation of the present disclosure is a user device. The user device includes a touchscreen including a display, a two-way camera, and an application circuit. The client application is structured to provide a first view of a user through a first camera input of the two-way camera device, a user image displayed on the display, provide a second view of an object associated with a third party through a second camera input of the two-way camera device, an object image displayed on the display, determine third party information from the object image, determine a payment amount, detect a slide of a user input member from the user image to the object image displayed on the display, and in response to detecting the slide of the user input member from the user image to the object image, initiate a payment from the user account to the third party equal to the payment amount.

DETAILED DESCRIPTION

Referring to the Figures generally, the systems, methods, and apparatuses provided herein according to various embodiments relate to facilitating and managing transactions between a variety of users and third parties using a user device. In various situations, one or more users may desire to make a transfer between the users. Using the systems and methods described herein, the users can complete a transfer using a single user device by viewing all of the users through a camera of the user device, inputting a transfer amount, and using a touchscreen of the user device to swipe between the users. The direction of the swipe indicates to and from which users the money is transferred. In some situations, one or more users may desire to split a payment to a third party (e.g., a merchant, such as a restaurant). Using the system and methods described herein, the users can complete a split bill payment to the third party with a single user device. In addition, using the systems and methods described herein, a user can complete a payment to a third party by viewing an object (e.g., third party logo, item for purchase, etc.) and the user in the camera and swiping from the user to the object.

The systems and methods described herein provide an efficient and intuitive way for a user to manage payments to and from other users or third parties. For example, the systems and methods described herein allow multiple users to split a payment to a merchant (e.g., a restaurant check) using a single user device. In this way, the multiple users can use a single user device to split the payment, where the single user device communicates with a provider computing system. Therefore, instead of multiple user devices communicating with the provider computing system and/or multiple payment devices being presented to a merchant, a single device communicates with the provider computing system to complete the transaction, thereby reducing the number computing cycles necessary to complete a payment transaction. In addition, the functioning of the third party computing systems are also improved. Instead of swiping multiple payment devices and completing multiple transactions, a single transaction is processed by the third party computing system to complete a split bill payment. Furthermore, the systems and methods described herein can also authenticate the users without the user separately entering credentials.

Figure 1:
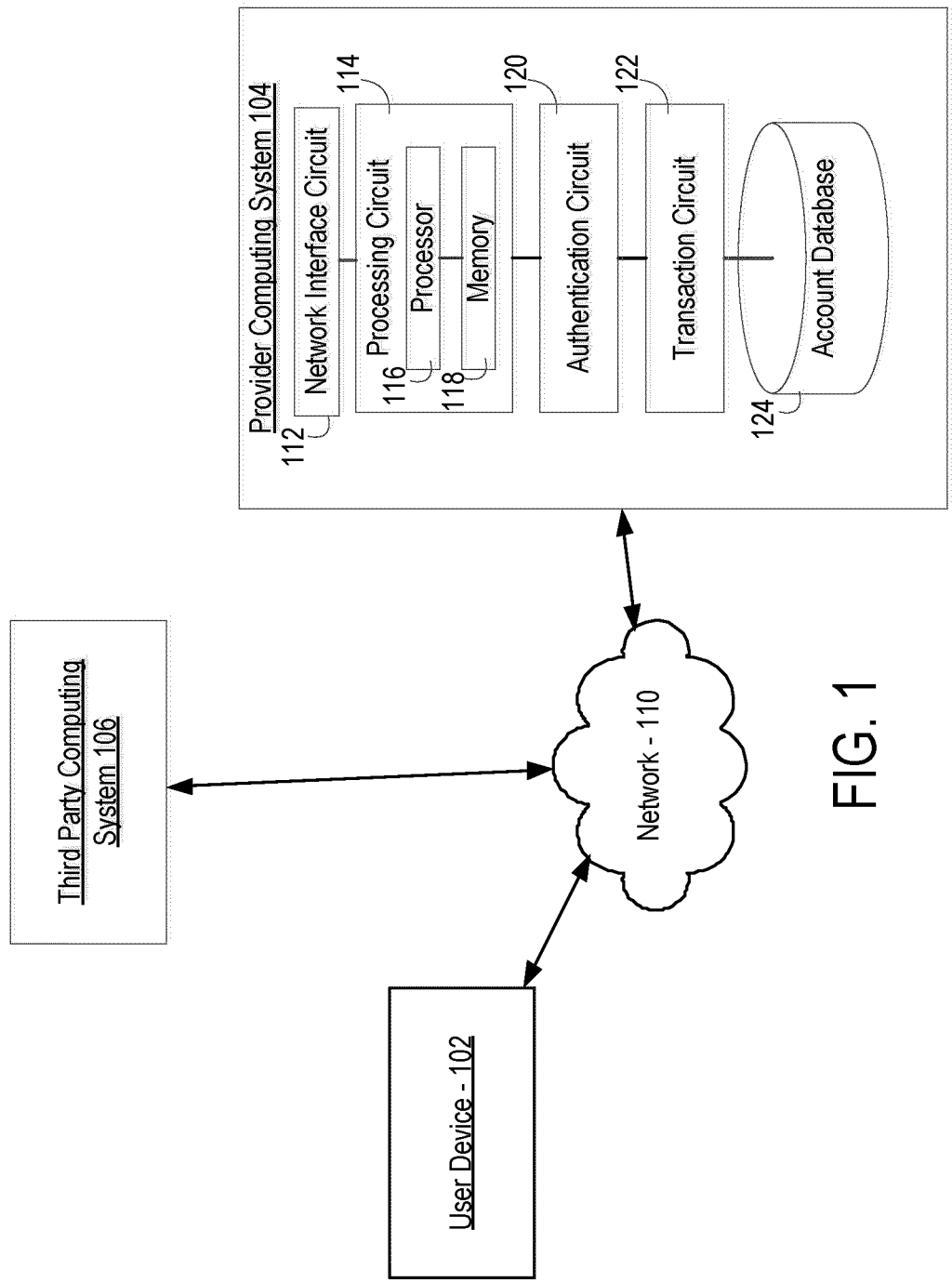
FIG. 1 is a block diagram of a transaction management system, according to an example embodiment.

Referring to FIG. 1, a transaction management system 100 for facilitating asset transactions, such as monetary transactions, based on an input from a user via a computing device, such as a personal computing device, is shown according to an example embodiment. System 100 includes a user device 102 communicably coupled via a network 110 to a provider computing system 104 and a third party computing system 106.

The user device 102 is structured to provide a user with the graphical user interfaces and functions described herein. More particularly, the user device 102 is configured to provide graphical user interfaces that are capable of receiving a user input, and communicate with the provider computing system 104 and the third party computing system 106 to allow the user to transfer money between the user's bank accounts, pay third parties, and request payments and receive requests for payments from other users in an efficient and intuitive manner. The user device 102 is described further with regard to FIG. 2 below.

The provider computing system 104 is associated with a provider entity that provides and maintains one or more financial accounts (e.g., demand deposit account, credit or debit card account, brokerage account, mortgage account, etc.) on behalf of the user. In some arrangements, the provider entity is an issuer of a payment vehicle held by the user. The payment vehicle may be used as a source payment vehicle for transactions engaged in via the user's mobile wallet. In the context of the present disclosure, the provider entity can include commercial or private banks, credit unions, investment brokerages, mobile wallet providers, and so on, but can also include any commercial entity capable of maintaining payment vehicles on behalf of a user, including retailers, vendors, service providers, and the like. In some arrangements, the provider entity is also a mobile wallet provider configured to manage mobile wallet accounts on behalf of its customers (i.e., users), including authenticating mobile wallet transactions involving debits from the users' payment vehicles.

In general, the provider computing system 104 is configured to provide data to the user device 102 for inclusion in user interfaces, to receive transaction requests from the user device 102, to execute the requested transactions, and to send confirmation messages to the user device 102. The data provided by the provider computing system 104 to the user device 102 includes a user's bank account balance(s) (e.g., a savings account balance and a checking account balance), credit card balances, bills (e.g., the identity of an entity that the user owes money to, an amount of money owed, and other details about the bill), requests for payment to or from other users, confirmations received from third party and/or other users, and/or any other information relating to a transaction that may be requested using the user device 102 as described herein. In some arrangements, the provider computing system 104 maintains accounts on behalf of the user (e.g., manages account balances, facilitates transfer of funds into and out of the accounts). The provider computing system 104 is communicably coupled to other computing systems, for example third party systems 106, to locate and aggregate the relevant data. The provider computing system 104 includes a series of application programming interfaces (APIs) configured to facilitate the exchange of communications between the provider computing system 104 and the third party system 106.

The provider computing system 104 includes a network interface circuit 112, a processing circuit 114, an authentication circuit 120, a transaction circuit 122, and an accounts database 124, all communicably coupled to each other. The network interface 112 facilitates connection of the provider computing system 104 to the network 110. Accordingly, the network interface 112 supports communication via the network 110 between the provider computing system 104, the user device 102, and the third party computer system 106. The network interface 112 may include a cellular modem, a Bluetooth transceiver, a Bluetooth beacon, a radio-frequency identification (RFID) transceiver, and/or a near-field communication (NFC) transmitter. In some embodiments, the network interface 112 includes cryptography capabilities to establish a secure or relatively secure communication session.

The processing circuit 114 is structured to control, at least partly, the provider computing system 104 as described herein. The processing circuit includes memory 118 and processor 116. The processor 116 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices of memory 118 (e.g., RAM, ROM, NVRAM, Flash Memory, hard disk storage, etc.) may store data and/or computer code for facilitating at least some of the various processes described herein. In this regard, the memory 118 may store programming logic that, when executed by the processor 116, controls the operation of the provider computing system 104.

The accounts database 124 is configured to hold, store, categorize, and otherwise serve as a repository for information associated with user accounts held by the provider 102. For example, the accounts database 124 stores account numbers, account balances, account ownership information, and the like. The accounts database 124 may further store information regarding merchants with which the user regularly interacts. For example, the accounts database 124 can include third party information such as merchant identifiers, merchant logos, account numbers held with utility providers, etc. The accounts database 124 can further store information regarding other users of the system 100, including any user with which the user associated with the user device 102 interacts. The stored information can include facial features, fingerprint data, and other authentication and identification information regarding all users and third parties. The accounts database 124 is structured to selectively provide access to information relating to an account at the provider. In this regard, as discussed further herein, the accounts database 124 is communicably and operatively coupled to the transaction circuit 122 and authentication circuit 120 such that the system 100 may facilitate transactions requested by the user device 102 based on internal user account information.

The authentication circuit 120 is configured to receive user identity information from the user device 102 and authenticate the user based on the identity information. The authentication circuit 120 is thus communicably and operatively coupled to the user device 102 and the accounts database 124 to access user identity and account information to authenticate the user. As an example, the authentication circuit 120 receives user identity information in the form of a finger swipe on the user device 102. The fingerprint of the user is captured by the user device 102 and transmitted to the authentication circuit 120 for user authentication. As another example, the user captures their face with the user device 102 and the user device 102 uses facial recognition to transmit information relating to the user's face to the authentication circuit 120 to identify and authenticate the user. In some embodiments, the authentication circuit 120 can complete a primary authentication using one of these techniques and a secondary authentication using the other technique. For example, a user can be authenticated using both a fingerprint scan and facial recognition.

The authentication circuit 120 is further configured to receive third party identity information, including recipient/transferee identity information to authenticate a third party and/or another user in the system 100. The authentication circuit 120 can store authentication information related to third parties and/or other users of the system 100 in the accounts database 124. When a transaction request is received by the transaction circuit 122 as detailed below, the transaction circuit 122 communicates with the authentication circuit 120 to authenticate both the requestor user (e.g., user associated with the user device 102) and a recipient user or third party (e.g., another individual or merchant to whom a transfer is being made, etc.).

The authentication circuit 120 can authenticate any individual or third party upon receiving facial data from the facial recognition circuit 146 of the user device 102. When the user associated with the user device 102 captures or live-feeds an image of another individual, that individual's face is recognized using facial recognition. The facial features of that individual may have been previously stored and are retrievable from the accounts database 124 of the provider computing system 104. In another embodiment, their facial features are stored on the user device 102 for later access and authentication. A user may store another individual's picture on the user device 102 for later access. In this way, the user can pull up the individual's picture and instead of displaying a split-screen live-image with the user and the other individual, the user can view himself in the front-facing camera and the picture of the other individual on a portion of the screen and swipe from the user's image to the other individual's picture to complete a transaction.

In another embodiment, the authentication circuit 120 can authenticate any individual or third party upon receiving a fingerprint scan from the individual through the touchscreen 142 of the user device 102. The fingerprint of that individual may have been previously stored and are retrievable from the accounts database 124 of the provider computing system 104. In another embodiment, their fingerprint is stored on the user device 102 for later access and authentication.

The transaction circuit 122 is configured to receive transaction requests from the user device 102 and complete the transaction in accordance with the user input received. The transaction circuit 122 is thus communicably and operatively coupled to the user device 102 to receive the user input. The transaction circuit 122 is also coupled to the accounts database 124 to retrieve information regarding one or more user accounts (e.g., account balances, account types, etc.) to complete the transaction. The transaction circuit 122 receives transaction information including a transaction amount and a user input from the user device 102 and is configured to determine a type of transaction requested by the user. For example, the user uses the user device 102 to capture both the user's face and another user face with camera and in real-time swipes from his face to the other user's face on the user device 102 touchscreen 142. The transaction circuit 122 receives an indication from the user device 102 of this input and determines that the user has requested to transfer money to the other user. As another example, the user swipes from his face to a logo of the merchant and the transaction circuit 122 determines that the user has requested to pay the merchant.

The transaction circuit 122 is also configured to receive inputs from third parties or other individuals using the system 100. For example, the transaction circuit 122 can receive a confirmation message from a third party computing system 106 with an indication that the third party approves and/or confirms the transaction requested by the user associated with the user device 102. Accordingly, the transaction circuit 122 is communicably and operatively coupled to the third party computing system 106. The third party computing system 106 can be associated with a merchant, another individual, a utility company, a landlord, etc. In some embodiments, the transaction circuit 122 generates and transmits a transaction approval request to the third party computing system 106. In return, the transaction circuit 122 receives an approval or confirmation message from the third party computing system 106 indicating that the third party approves the requested transaction.

The third party computing system 106 refers to computer systems associated with third parties relative to the user. The user of user device 102 owes money to or is regularly billed for products/services by several third parties (e.g., a merchant, utility company, another individual, a cellphone service provider, a cable television provider, an internet provider, an insurance company, a landlord, a creditor). In one example, the third party associated with the third party computing system 106 is a merchant visited by the user (with one or more other users), such as a restaurant. In another example, the third party associated with the third party computing system 106 is a utility company to which the user owes a payment of a regularly issued bill (e.g., billed monthly). In another example, the third party associated with the third computing party system 106 is a landlord in a landlord-tenant relationship with the user. In yet another example, the third party associated with the third party system 106 is another individual to which the user makes regular value transfers. The third party computing system 106 can be associated with any third party with which the user interacts. The third party computing system 106 is communicably coupled to the provider computing system 104 to facilitate the communication of payment information and account information to the user device 102, to execute requested money transfers, and to accept transfers and payments of money. For example, in some embodiments the provider computing system 104 includes multiple application programming interfaces (APIs) that facilitate data transfer between various third party computing systems 106 and the provider computing system 104. The APIs may use a user's credentials to access secure user-related data in the third party computing system 106.

Figure 2:
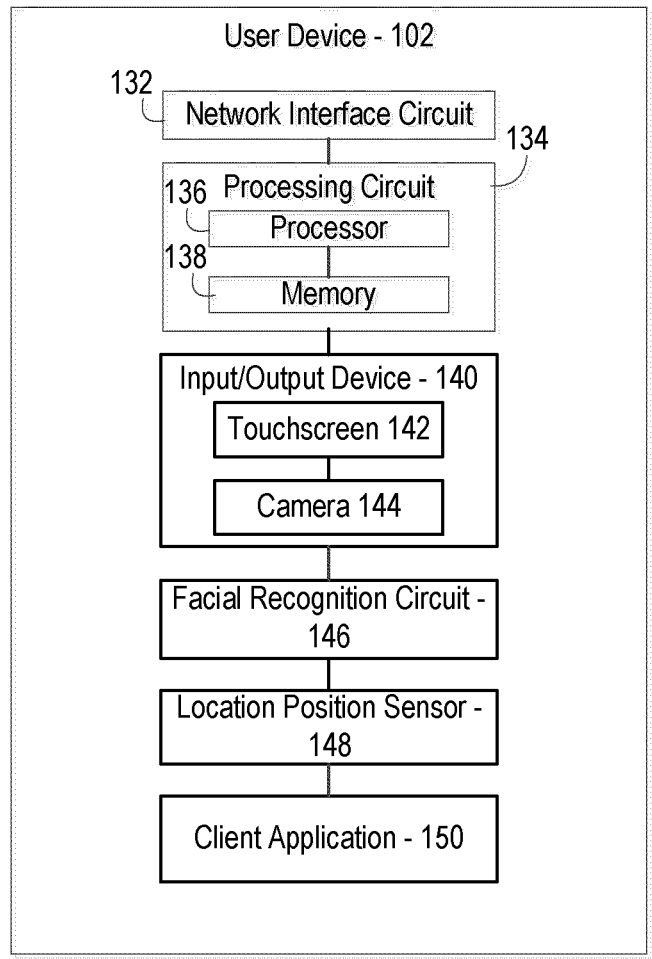
FIG. 2 is a block diagram for a user device for use with the transaction management system of FIG. 1, according to an example embodiment.

Referring to FIG. 2, the user device 102 is shown, according to an example embodiment. The user device 102 includes a network interface 132, a processing circuit 134, input/output device 140, a facial recognition circuit 146, a location position sensor 148, and a client application 150. The network interface 132 facilitates connection of the user device 102 to the network 110. Accordingly, the network interface 132 supports communication via the network 110 between the user device 102 and the provider computing system 104 and the third party computing system 106. The network interface 132 may include a cellular modem, a Bluetooth transceiver, a Bluetooth beacon, a radio-frequency identification (RFID) transceiver, and/or a near-field communication (NFC) transmitter. In some embodiments, the network interface 132 includes cryptography capabilities to establish a secure or relatively secure communication session.

The processing circuit 134 is structured to control, at least partly, the user device 102 as described herein. The processing circuit includes memory 120 and processor 122. The processor 122 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices of memory 120 (e.g., RAM, ROM, NVRAM, Flash Memory, hard disk storage, etc.) may store data and/or computer code for facilitating at least some of the various processes described herein. In this regard, the memory 120 may store programming logic that, when executed by the processor 122, controls the operation of the user device 102.

The input/output device 140 is structured to exchange communication(s) with a user of the user device 102. The input/output device 140 receives user interface components for presentation to a user from the processing circuit 134 and/or the client application 150, and communicates user inputs to the processing circuit 134 and/or the client application 150. An input aspect of the input/output device 140 allows a user to provide information to the user device 102, and may include, for example, a keypad, a keyboard, a mouse, a joystick, a touchpad, a touchscreen, a microphone, a camera, a scanner, a fingerprint sensor, facial recognition hardware or software, an eye scanner, a biometric data scanner, a sensor that detects movement, accelerometers, voice recognition hardware or software, a signature reader, a payment card reader, a payment device reader, an input device that may be able to communicate wirelessly or through a wired connection with another device, etc., or a combination thereof, and any other type of input devices that would allow a user to provide information that could be used to identify or authenticate a person or that could capture information that could be used to identify or authenticate the person. An output aspect of the input/output device 140 allows a user to receive information from the user device 102, and may include, for example, a display, a speaker, a vibrating component such as a motor, illuminating icons, LEDs, sounds, an output device that may be able to communicate wirelessly or through a wired connection with another device, etc., or a combination thereof, or any other type of output devices that can provide information.

The input/output device 140 includes a touchscreen 142. The touchscreen 142 is configured to display a graphical user interface and to allow a user to interact directly with what is displayed on the graphical user interface by touching corresponding areas of the touchscreen 142. More particularly, the touchscreen 142 receives input from a user by detecting contact between the touchscreen 142 and a user interaction member (e.g., finger, stylus) in a particular location on the touchscreen 142. Accordingly, the touchscreen 142 is configured to detect and differentiate between taps, swipes, slides, etc. of a user interaction member on the touchscreen 142, including identifying coordinates on the touchscreen 142 corresponding to the user interaction and to elements displayed in the graphical user interface. Additionally, the touchscreen 142 may be structured to differentiate between user touches of different pressures to provide an additional input dimension. In various embodiments, touchscreen 142 is a resistive touchscreen, a capacitive touchscreen, or other type of touchscreen.

The input/output device 140 also includes one or more cameras 144 (e.g., digital camera, video camera) for capturing visual data (e.g., still images or digital video) representing the user's view through a viewing area of the user device 102. The camera 144 includes a two-way camera, having a first input side facing the user while the user is viewing the touchscreen 142 (e.g., user or front-facing camera), which receives a first input and generates a first image display, and a second input side facing away from the user of the user device 102 (e.g., rear-facing camera), which receives a second input and generates a second image display. The images viewed through both the first and second input sides are viewable through the user device screen simultaneously. In this way, the user can view himself and a second user at the same time in the viewing area of the user device 102 (e.g., in a split-screen 604, 704 shown in FIGS. 6-7). In addition, the user can view himself and an item through the viewing area of the user device 102 using the two-way camera. The user can also view himself and one or more other users and an object through just the front-facing camera.

The camera 144 is also configured to view and scan a code affixed to an object, such as a Quick Response (QR) code, barcode, etc. The camera 144 can communicate the code to the provider computing system 104 and/or the third party computing system 106 for determination of the identity of an object, price of a scanned object, etc.

As used herein, "swipe" or "slide" ("slid", "sliding", "slides", etc.) refers to a movement of a user interaction member from a first point on the touchscreen 142 to a second point displaced from the first point on the touchscreen 142, with the user interaction member remaining substantially in contact with the touchscreen 142 throughout the movement. The term "slide" (slid, sliding, etc.) may also encompass a series of spatially contiguous yet temporally separated slides. For example, a continuous slide from a first point to a second point, followed by a disconnection between the user interaction member and the touchscreen 142, followed by a reconnection at the second point and a slide to a third point is referred to herein as a slide from the first point to the third point. However, it should be noted that some embodiments require a continuous (e.g., spatially and temporally unbroken) slide from an origin point to a goal point. In some embodiments, a "swipe" or "slide" can include a circular movement, such as a clockwise or counter-clockwise direction input. In some embodiments, the length of time the user input member is in contact with the touchscreen 142 indicates the amount of value that the user would like to pay and/or transfer. For example, the longer the user holds the user input member on the touchscreen 142, the higher the value he would like to transfer or pay.

The facial recognition circuit 146 is configured to receive an image of the user from the input/output device 140 and parse facial features from the image to identify the user based on their facial features. The facial recognition circuit 146 analyzes patterns based on the user's facial textures and shape. For example, the facial recognition circuit 146 extracts features from an image of the user's face and analyzes the relative position, size, and/or shape of the eyes, nose, cheekbones, jaw, etc. The facial recognition circuit 146 may use skin surface textural analysis, which turns the unique lines, patterns, and spots apparent in a user's skin into a mathematical space, and/or three-dimensional recognition, which uses sensors to capture information about the shape of a face. In some embodiments, a combination of techniques is used to capture and recognize the facial features of the user. In some embodiments, the facial recognition circuit 146 transmits the parsed facial information to the provider computing system 104 to authenticate the user, where the authentication circuit 120 retrieves user facial information from the accounts database 124 and compares the stored facial information to the information received from the facial recognition circuit 146 of the user device 102.

The location position sensor 148 is structured to receive location data and determine a location or receive information indicative of a location of the user device 102. In one embodiment, the location position sensor 148 includes a global positioning system (GPS) or any other type of location positioning system. As such, the location position sensor 148 receives latitude data, longitude data, and any other type of location or position data to determine the location of the user device 102. In other embodiments, the location position sensor 148 receives an explicit location identification from the user of the user device 102. All such variations are intended to fall within the spirit and scope of the present disclosure.

The client application 150 is configured to receive information from the provider computing system 104, generate user interfaces for presentation by the input/output device 140, receive input from a user via the input/output device 140, and transmit user inputs and commands to the provider computing system 104. Accordingly, the client application 150 is communicably coupled to the provider computing system 104 via network interface 132 and network 110. In some embodiments, the client application 150 is a server-based application executable on the user device 102. In this regard, a user may have to first download the application prior to usage. In another embodiment, the client application 150 is hard-coded into the memory of the user device 102. In an alternative embodiment, the client application 150 is a web-based interface application. In this configuration, the user may have to log onto or access the web-based interface before usage of the application. The client application 150 may be at least partly supported by a separate computing system (e.g., provider computing system 104) comprising one or more servers, processors, network interface modules, etc. that transmit the application for use to the user device 102. In yet another alternative embodiment, the client application 150 includes its own set of dedicated or substantially dedicated hardware components and associated logic. The client application 150 may include an application programming interface (API) that facilitates integration with other applications, features, components, etc. of the user device 102. All such variations and combinations are intended to fall within the scope of the present disclosure.

As described in detail below, the client application 150 generates and provides a graphical user interface that includes various user interfaces depending on the selection transaction. According to various embodiments, the origin is a first predefined region, line, or point on the graphical user interface and the goal is a second predefined region, line, or point on the graphical user interface. An example in which the origin is a point corresponding to a first end of the slider feature and the goal is a point corresponding to a second end of the slider feature is shown in FIG. 6 and described in detail with reference thereto. Based on input data from the touchscreen 142, the client application 150 determines if a user interaction member touched the touchscreen 142 at a position corresponding to the origin of the slider feature and slid to a position corresponding to the goal (e.g., second user, item, receipt, logo, etc.), in some cases substantially along a preset path of the slider feature. In response to detecting that the user interaction member slid from the origin to the goal of the slider feature, the application circuit 118 generates a signal to transmit to the provider computing 104 that includes a request to complete a transaction corresponding to the user input (e.g., transfer money from a first account associated with a first user to a second account associated with a second user, make a payment to a merchant, make a payment to a utility provider, etc.). Further details are described with reference to FIGS. 2-8.

The client application 150 can generate and provide a graphical user interface which displays the user's various accounts or payment devices, such as for various credit accounts or demand deposit accounts, overlaid onto the user interface. In addition, the client application 150 can allow a user to select a stored image from the memory of the user device 102 and generate and display the image on the user interface for interaction with by the user. For example, the user can select a stored image showing another individual's face to display on the user interface. The image may be displayed next to a live-feed image of the user viewed from a front-facing camera view. The user can then interact with the live-feed image and the still image to complete a transaction request. For example, the user can swipe from his live-feed image to the still image of the other individual to complete a transfer transaction request to the individual. As another example, the user can select a stored image of a merchant logo to display on the user interface. Similarly, the image may be displayed next to a live-feed image of the user viewed from a front-facing camera view. The user can then interact with the live-feed image and the still image to complete a transaction request. For example, the user can swipe from his live-feed image to the still image of the logo to complete a payment transaction request to the merchant. Other examples of stored images can include, but are not limited to, a barcode, QR code, stored pictures of other items that can be used as a token for a payment transaction, etc.

Figure 3:
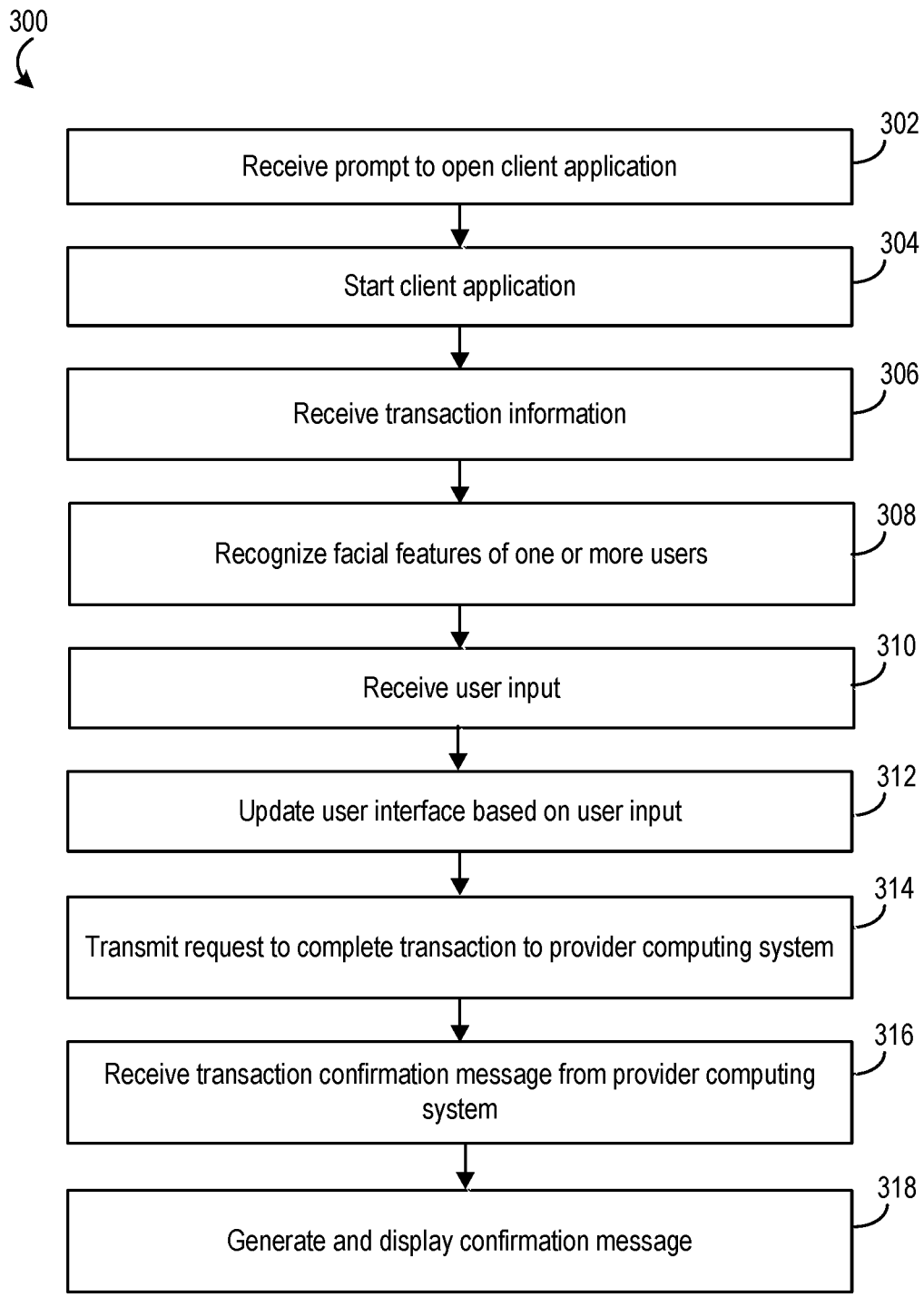
FIG. 3 is a flowchart of a process of facilitating transactions by a user associated with the user device of FIG. 2 using facial recognition, according to an example embodiment.

Referring now to FIG. 3, a flowchart of a process 300 for facilitating transactions by a user associated with the user device of FIG. 2 using facial recognition is shown, according to an example embodiment. Process 300 can be carried out by the user device 102 in communication with the provider computing system 104 of FIGS. 1-2, and reference is made thereto in the following discussion for the sake of clarity. Process 300 can be used in splitting a bill between various users, making a transfer between various users, completing a payment from a first user to a second user, and various other types of transactions.

A prompt to open the client application is received at 302. In some arrangements, the prompt is received by the input/output device 140 of the user device 102. The prompt may include a selection of an icon on the display of the user device 102. The client application is started at 304. The input/output device 142 of the user device 102 is updated to display a client application interface. In some arrangements, the user device 102 receives user data from the provider computing system 104 and generates a home screen graphical user interface for presentation on the touchscreen 142. The user data includes information relating to the user's bank accounts (e.g., demand deposit accounts, investment accounts, loan accounts such as mortgages, etc.), bills (e.g., recurring monthly bills, etc.), payment requests, etc. that may be displayed by the user device 102 or otherwise used in process 300 as described below. Accordingly, the user data includes data relating to accounts managed by the provider computing system 104 as well as data relating to third parties (e.g., from third party computing systems 106). For example, the provider computing system 104 and the APIs may use the user's credentials (login, username and password, etc.) to access secured information in third party systems 106 (e.g., for use with landlord, utility provider, etc.). The third party information may also include a merchant logo, merchant identifier, etc.

Transaction information is received at 306. The transaction information can include an amount of a transaction, third party information, split payment information, etc. In some arrangements, the transaction information can be received via user input. For example, the user enters the amount to be paid or transferred, third party information, other user information, split payment percentage information, etc. In some arrangements, the transaction information is captured via the camera 144. For example, the user holds up a receipt or bill to be paid to be viewed through the camera 144 and the amount of the bill or receipt is recognized and captured by the camera 144. In another example, the user holds up an item to be purchased or inventoried to be viewed through the camera 144 and the item is recognized (e.g., via a barcode, QR code, etc.).

As a further example of transaction information received at 306, the user device 102 or the provider computing system 104 determines a bill split recommendation. The bill split recommendation is determined based on a user's historical transaction history relating to that bill and payment requests sent to other people by the user or payments received by user from other people. Historical transaction data may be collected from usage data of user device 102 (e.g., by capturing transactions initiated by a user through inputs to user device 102) and/or from a history of transfers in-and-out of a user's accounts managed by the provider computing system 104 (e.g., by capturing amounts and parties involved in the moving of assets in and out of the user's accounts). The historical transaction data is mined to identify repeat correlations between a transfer out of a user's account for a particular amount and a close-in-time request for a fraction (e.g., one-half, one-third) of that amount from a third party or transfer into the user's account for a fraction of the amount.

As an example, for consecutive months a user pays a utility bill using user device 102, and then shortly thereafter requests payment from the user's roommate for half of the amount of the utility bill via user device 102. Historical data for these transactions is collected and stored in the user device 102 or the provider computing system 104 (e.g., accounts database 124), and used to determine that the user splits bills from the utility company with the roommate (e.g., based on the fact that the user repeatedly requested an amount of money from the roommate close-in-time to the bill payment and that the amount requested was a consistent fraction of the amount of the bill payment). A bill split recommendation is thereby determined that recommends that a new bill from the utility bill also be split with the roommate.

As another example, the user routinely goes to a restaurant with person A and person B. Upon receiving the bill at the restaurant, the user, person A, and person B split the bill equally. The user device 102 can determine, using the location position sensor 148, that the user is at a restaurant frequented by the user, person A, and person B. In combination with receiving the bill amount and detecting the user at the restaurant, the user device 102 recommends splitting the bill as routinely done previously. A bill split recommendation is thereby determined that recommends splitting the bill between the user, person A, and person B.

Facial features of one or more users are recognized at 308. In some arrangements, the facial features of one or more users is recognized by the facial recognition circuit 146. As discussed above, the facial features of one or more users viewed through the camera 144 of the input/output device 140 of the user device 102 are captured and parsed from the one or more user images.

User input is received at 310. In some arrangements, the user input can include, but is not limited to, a swipe from the user's face to another user's face while both faces are viewed within a split-screen using the two-way camera function, capturing the user's face and a bill or receipt simultaneously, a swipe from the user's face to a merchant logo, payment selection when two user faces are viewable in the split-screen view. The direction of the swipe or slide indicates to and from which users the payment or transfer should be made (e.g., which way the value should be transferred). For example, if a user swipes from a first user to a second user, the swipe direction indicates the transfer or payment should be made from the first user to the second user. In addition, user input can include a clock-wise or counter-clockwise input slide from a user input member, where the user slides in a movement over multiple users in a clockwise or counter-clockwise direction. In some embodiments, a clockwise input can indicate a request to send value and a counter-clockwise input can indicate a request to receive value (or vice versa).

As another example, the user device 102 may receive a user selection (e.g., touch, tap) of a payment or transfer amount field on the graphical user interface and launch a number pad in response. The user device 102 then receives user input of an amount as a number entered into the number pad by a user. As another example, the user device 102 detects a slide of a user input member (e.g., finger, stylus) from the first end of the slider feature towards the second end of the slider feature. In preferred embodiments, the first end and the second end are arranged on the graphical user interface such that a slide from the first end to the second end creates the impression for the user of sliding or pushing assets away from the user and towards a receiving entity. The first end of the slider feature has first coordinates on the touchscreen and the second end of the slider feature has second coordinates on the touch screen. The user device 102 can determine whether the user input member slid from the first end towards the second end based on the coordinates of the intermediate position relative to the first coordinates and second coordinates (e.g., whether the distance between the intermediate position and the second coordinates is less than the distance between the first coordinates and the second coordinates). The user input can also include swiping between different user accounts of a single user. For example, the user can swipe between a savings account and a checking account to transfer money from the savings account to the checking account, or vice versa. These various example user inputs are shown in the example user interfaces of FIGS. 5-8.

The user interface of the user device 102 is updated based on the user input at 312. In some arrangements, after receiving user input of a payment amount or split payment percentage, the user interface is updated to reflect that input. For example, the user inputs that a payment should be split between a first and second user based on the first user owing 40% of a bill and the second user owing 60% of the bill. In this case, the user interface may be updated to reflect the actual payment amounts owed by each user prior to completing the transaction. In another example, the user inputs that a certain payment amount should be paid to a merchant. Prior to completing the transaction, the user interface may be updated to reflect specific merchant information, etc. account balances shown on the user interface are updated to show the effects of the transfer. In another example, during a slide of a user input member, user account balances are dynamically updated. In this way, the account balances are shown to reflect the transfer amount switching accounts proportionally to the progress of the user input member from the first end to the second end (e.g., when the user input member has slid halfway from the first end to second end, half the transfer amount is shown as having switched accounts). In other arrangements, the user interface is updated to show changes in the account balances that would occur as a result of the potential transfer if executed. That is, in such embodiments, the transfer amount indicated in the payment or transfer amount field on the graphical user interface is subtracted from an account balance displayed for the transferor account and added to an account balance displayed for a transferee account. The effects of a transfer are thereby displayed to a user before a final command to initiate the transfer is received from the user. In some embodiments, the user interface of the user device 102 is not updated after user input (e.g., a slide from a first user to a second user) and instead, process 300 proceeds directly to step 314, where the transaction request is transmitted to the provider computing system 104.

A request to complete a transaction is transmitted to the provider computing system 104 at 314. In some arrangements, in response to a user input, the user device 102 sends a request to the provider computing system 104 to execute the transaction. The request includes the payment or transfer amount, an identification of the third party or other user, the user account, and an identification of the third party account. The user device 102 receives a transaction confirmation message from the provider computing system 104 at 316. The confirmation message indicates that the provider computing system 104 has received the transaction request and that the transaction has been or will be completed as requested.

In response to the confirmation message, the user device 102 generates and displays a confirmation message to the user in the graphical user interface at 318. The confirmation view assures the user that the user's transaction request has been received and has been or will be completed. In some embodiments, the confirmation message includes an indication that confirmation or approval has also been received by the provider computing system 104 from the third party computing system 106 and/or another computing system associated with another user.

Figure 4:
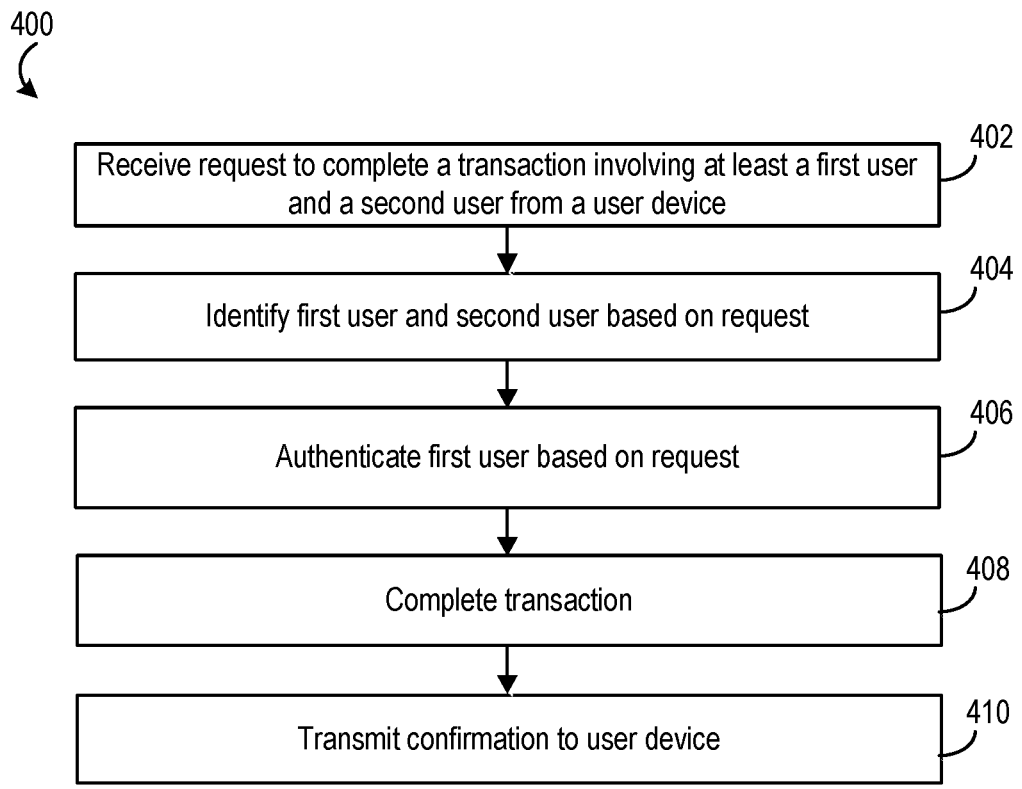
FIG. 4 is a flowchart of a process of facilitating a transaction using the provider computing system of FIG. 1, according to an example embodiment.

Referring now to FIG. 4, a flowchart of a process 400 for facilitating transactions by a user associated with the user device of FIG. 2 is shown, according to an example embodiment. Process 400 can be carried out by the provider computing system 104 in communication with the use device 102 of FIGS. 1-2, and reference is made thereto in the following discussion for the sake of clarity. Process 400 can be used in splitting a bill between various users, making a transfer between various users, completing a payment from a first user to a second user, and various other types of transactions.

A request to complete a transaction between a first user and a second user is received at 402. In some arrangements, the request to complete a transaction is received from a user device 102. The user device 102 captures transaction information, user input, and user information as described above with regard with process 300 shown in FIG. 3. The request to complete a transaction can include user identification information, such as facial features and fingerprint scans. The request to complete a transaction also includes the transaction information including, but not limited to, a payment amount, a transfer amount, merchant identifiers, purchase item identifiers, etc.

The first user and the second user are identified at 404. In some arrangements, the first user and the second user are identified using facial recognition, as described above with regard to process 300. In this case, the facial recognition circuit 146 of the user device 102 captures and parses facial features and transmits the facial features to the provider computing system 104 for identification. In some embodiments, the facial recognition circuit 146 identifies the users based on their facial features by retrieving information stored in the user device 102. In some embodiments, the users are identified at the provider computing system 104 using stored facial feature data in the accounts database 124.

In some arrangements, the first and second users are identified using fingerprint scans. The user device 102 may capture the fingerprint of one or more of the users as the users contact the touchscreen 142. The fingerprint data may be transmitted to the provider computing system 104 to identify the users and/or may be identified by information stored on the user device 102 (e.g., stored fingerprint user password data, etc.). The provider computing system 104 may communicate with the third party computing system 106 to receive fingerprint information for the second user or third party. The first user and the second user are authenticated at 406. The first and second user may be authenticated using the same features (e.g., facial recognition, fingerprint scan, etc.) as used to identify the users. The authentication circuit 120 matches user information to user authentication information stored in the accounts database 124 to authenticate the one or more users. In addition, the authentication circuit 120 may receive authentication information from the third party computing system 106 to use to authenticate the second user or third party.

In some arrangements, the authentication circuit 120 is further configured to receive third party identity information, including recipient/transferee identity information (e.g., facial features, fingerprint data, etc.) to authenticate a third party and/or another user in the system 100. The authentication circuit 120 can store authentication information related to third parties and/or other users of the system 100 in the accounts database 124. When a transaction request is received by the transaction circuit 122 as detailed above, the transaction circuit 122 communicates with the authentication circuit 120 to authenticate both the requestor user (e.g., user associated with the user device 102) and a recipient user or third party (e.g., another individual or merchant to whom a transfer is being made, etc.).

A transaction involving at least the first user and the second user is completed at 408. In some arrangements, the transaction is completed by the transaction circuit 122 of the provider computing system 104. The transactions can include, but are not limited to, splitting a bill between the users, making a transfer between the users, completing a payment from a first user to a second user, and various other transactions. A confirmation message is transmitted to a user device at 410. Upon completing the transaction, a confirmation message is generated and transmitted to the user device by the provider computing system 104 (e.g., network interface circuit 112).

Referring now to FIGS. 5-8, example embodiments of graphical user interfaces generated by and displayed on user device 102 are shown. It should be understood that various modifications may be made to the graphical user interfaces of FIGS. 5-8 without departing from the scope of processes 300 and 400, and that the graphical user interfaces of FIGS. 5-8 may be used to facilitate operations and functions beyond those included in processes 300 and 400.

Figure 5:
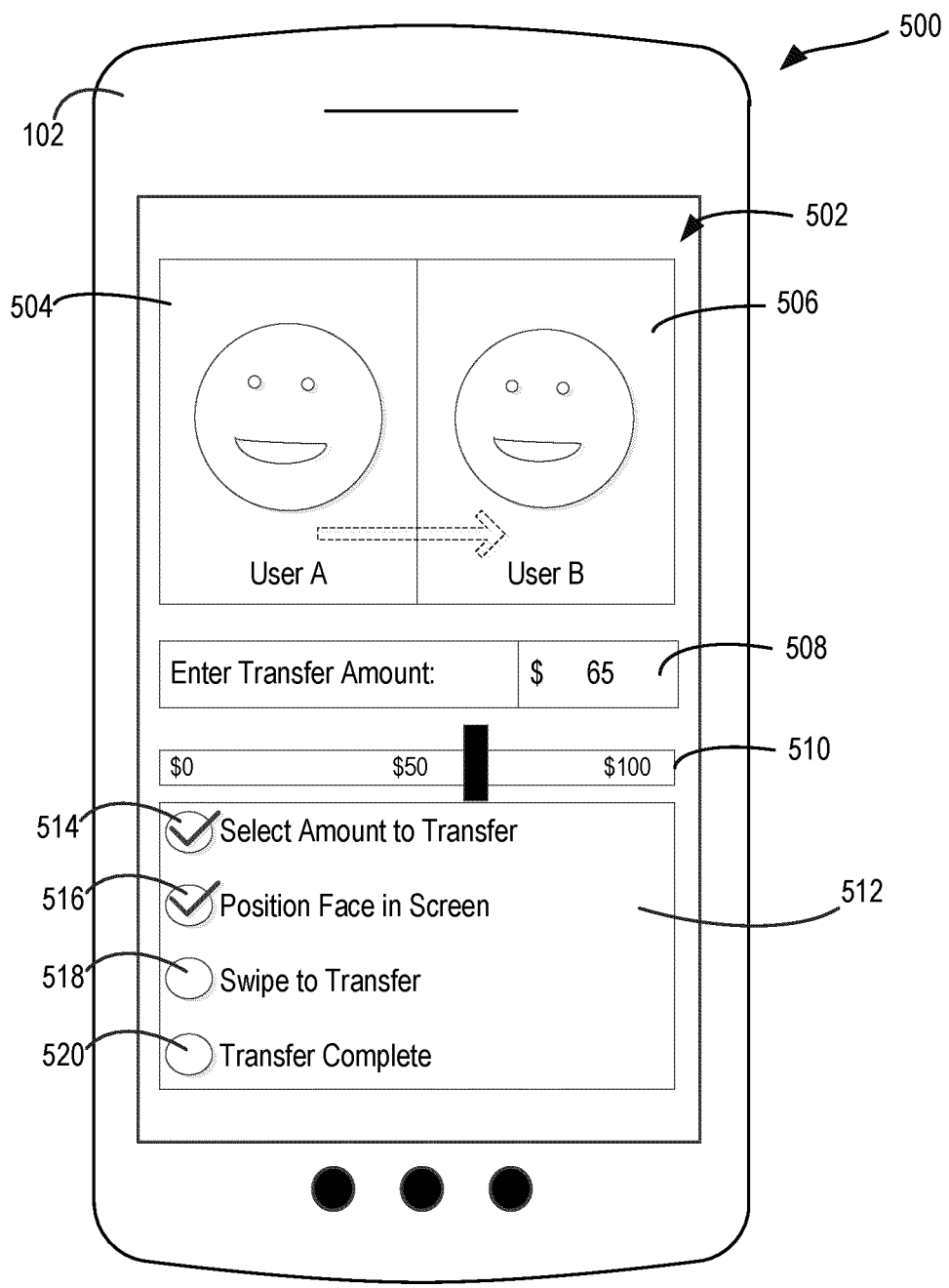
FIG. 5 is an example graphical user interface on the user device of FIG. 1, according to an example embodiment.
Figure 6:
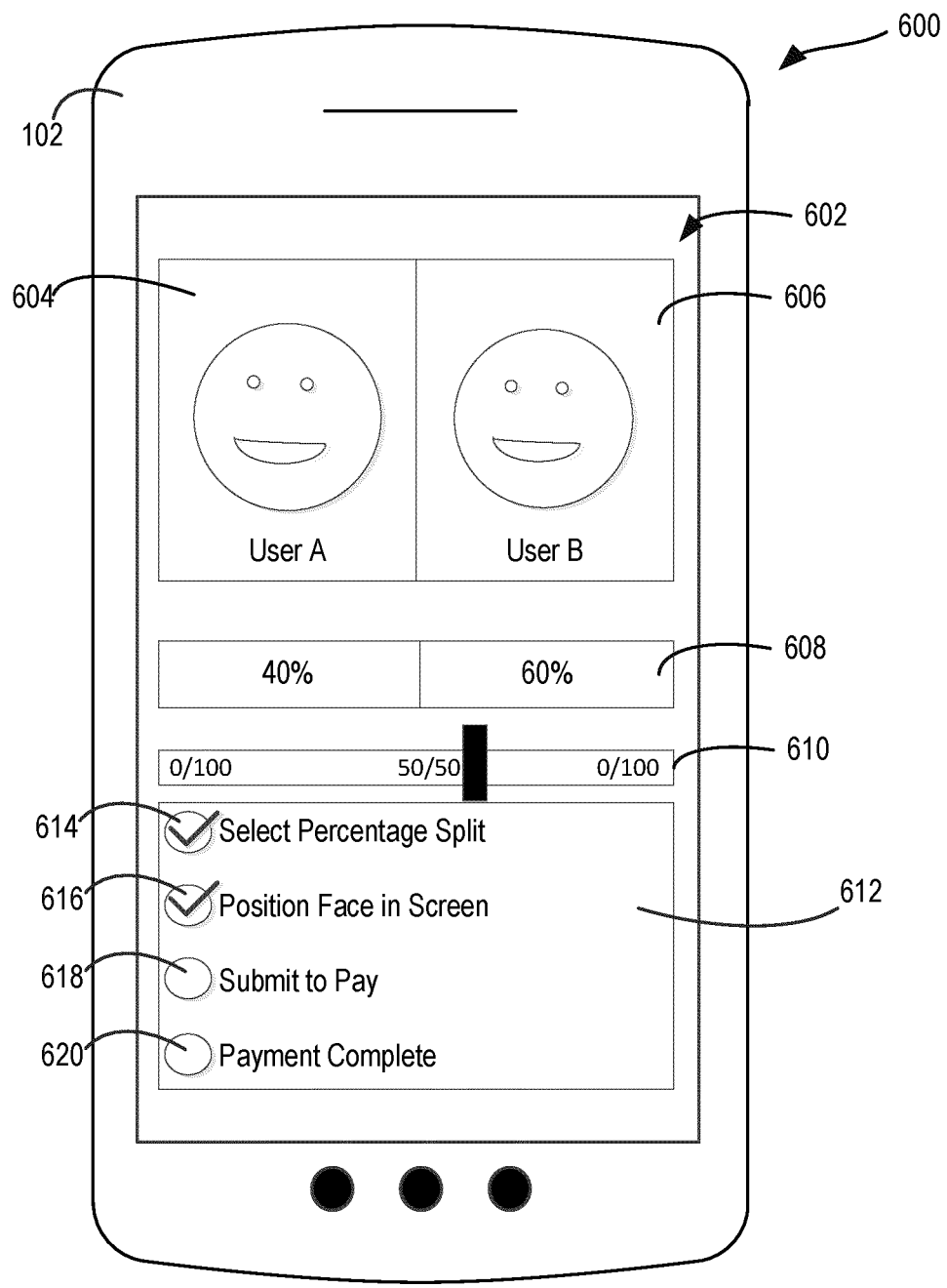
FIG. 6 is an example graphical user interface on the user device of FIG. 1, according to an example embodiment.

FIG. 5 shows an example embodiment of a user interface 500 displayed on user device 102 and used to complete a transfer between two users (e.g., between User A and User B). The user interface 500 includes a spit-screen display 502 or a transfer screen/display, where money can be transferred between two user accounts (e.g., User A's account and User B's account). The split-screen display 502 includes a first screen 504 displaying a front-facing camera view (e.g., viewing User A's face) and a second screen 506 displaying a rear-facing camera view (e.g., viewing User B's face). The user interface 500 also includes a transfer amount input 508 and a slider input 510. A user can use either of the transfer amount input 508 or slider input 510 to input a transfer amount. The input that is not used by the user may automatically update to reflect the user input receiving by the other input feature. For example, User A inputs $65 into the transfer amount input 508 and the slider input 510 updates to reflect the user input, and vice versa.

The user interface 500 also includes a status display 512. The status display 512 displays an indication of the step at which the transfer transaction is occurring and/or an instruction to the user on which step to perform next to complete the transaction. The status display 512 includes a "Select Amount to Transfer" indicator 514, a "Position Face in Screen" indicator 516, a "Swipe to Transfer" indicator 518, and a "Transfer Complete" indicator 520. Using the user interface 500, the user can complete a transfer of money using the following steps. First, the user inputs an amount to transfer between User A and User B. Next, User A and User B position their faces such that they are viewable in split-screen display 502 as shown. Then, one of User A or User B uses their finger (or a stylus) to swipe from User A to User B to indicate that the selected transfer amount should move from User A's account to User B's account. Once the swipe occurs, a transfer request is transmitted to the provider computing system 104 as described herein, the user device 102 receives a transaction complete message, and updates the user interface 500 to reflect the confirmation of a completed transfer.

Referring now to FIG. 6, an example user interface 600 is shown displayed on user device 102. The user interface 600 can be used to complete a split bill payment between one or more users (e.g., User A and User B). Prior to displaying the split bill payment user interface 600, the user device 102 receives input regarding a payment amount. In some arrangements, the payment amount is manually entered. In some embodiments, the payment amount is scanned from a bill or check at a merchant. In some embodiments, the payment amount is received via the provider computing system 104 and/or third party computing system 106 (e.g., utility bill routinely received).

The user interface 600 includes a spit-screen display 602 (or a bill split screen/display), where a bill payment can be split between two users (e.g., between User A's account and User B's account). The split-screen display 602 includes a first screen 604 displaying a front-facing camera view (e.g., viewing User A's face) and a second screen 606 displaying a rear-facing camera view (e.g., viewing User B's face). The user interface 600 also includes percentage amount input 608 and a slider input 610. A user can use either of the percentage amount input 608 or slider input 610 to input a percentage split amount. The input that is not used by the user may automatically update to reflect the user input receiving by the other input feature. For example, User A inputs that User A owes 40% of the bill and User B owes 60% of the bill into the percentage amount input 608 and the slider input 610 updates to reflect the user input, and vice versa.

The user interface 600 also includes a status display 612. The status display 612 displays an indication of the step at which the bill payment transaction is occurring and/or an instruction to the user on which step to perform next to complete the transaction. The status display 612 includes a "Select Percentage Split" indicator 614, a "Position Face in Screen" indicator 616, a "Submit to Pay" indicator 618, and a "Payment Complete" indicator 620. Using the user interface 600, the user can complete a payment of a bill using the following steps. First, the user inputs a percentage split amount between User A and User B. Next, User A and User B position their faces such that they are viewable in split-screen display 602 as shown. Then, one of User A or User B selects to submit the payment. Once the payment selection occurs, a payment request is transmitted to the provider computing system 104 as described herein, the user device 102 receives a transaction complete message, and updates the user interface 600 to reflect the confirmation of a completed payment.

Figure 7:
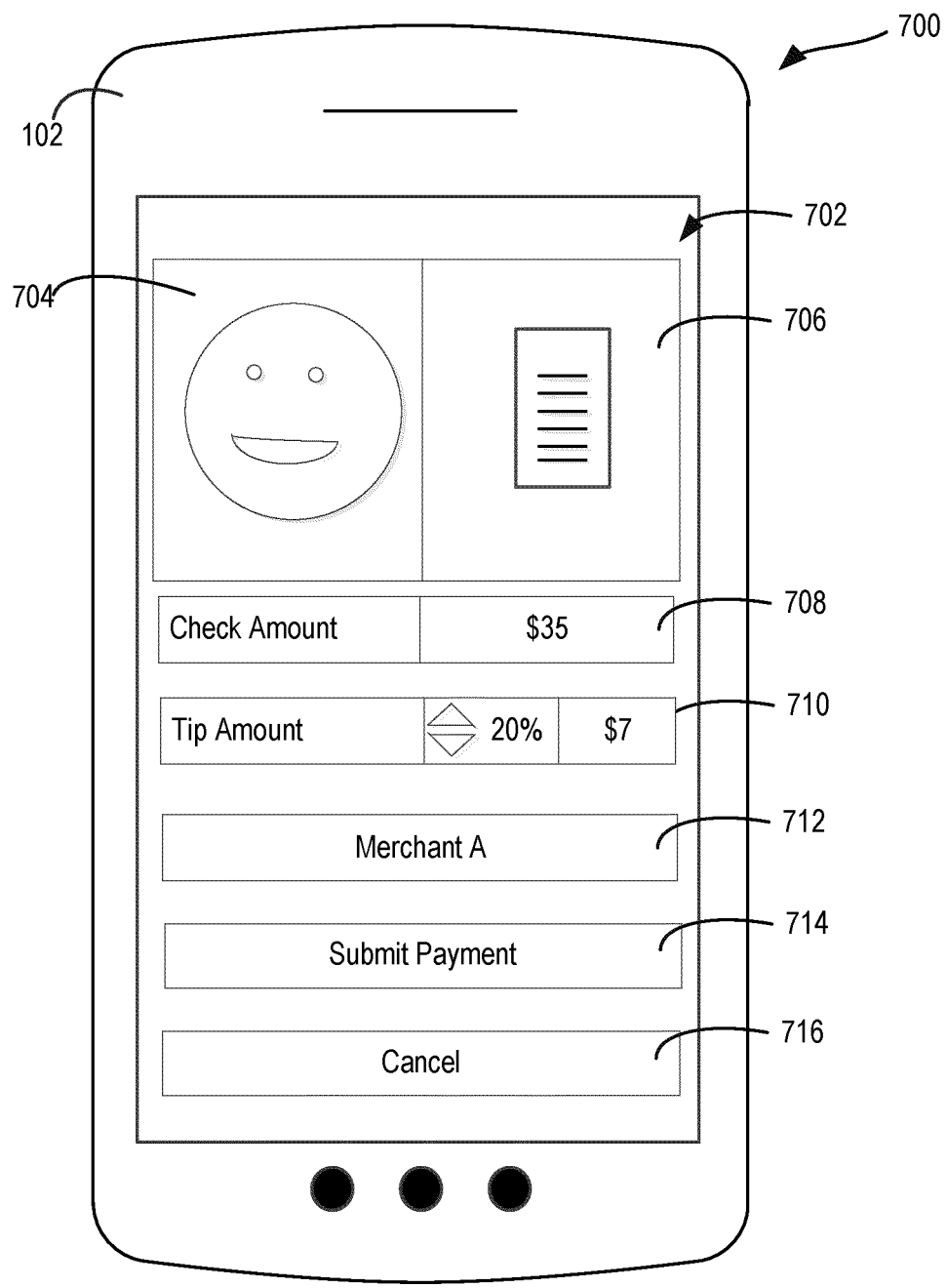
FIG. 7 is an example graphical user interface on the user device of FIG. 1, according to an example embodiment.

Referring now to FIG. 7, an example user interface 700 is shown displayed on user device 102. The user interface 700 can be used to complete a bill payment by one or more users. The user interface 700 includes a split-screen display 702. The split-screen display 702 includes a first screen 704 displaying a front-facing camera view (e.g., viewing user's face) and a second screen 706 displaying a rear-facing camera view (e.g., viewing a bill, check, receipt, item, etc.). The user interface 700 also includes a check amount input 708 and a tip amount input 710. The user can either input the check amount into the check amount input 708 or the user device 102 can scan the check, bill, or receipt and determine the check amount to automatically input the amount into the check amount input 708. Similarly, the user can input the tip amount into the tip amount input 710 or the user device 102 may automatically default to a certain tip amount based on the check amount. For example, a default tip amount of 20% of the check amount may be generated and displayed. The user can update this default amount using the tip amount input 710.

The user interface 700 also includes a merchant input 712. The merchant input 712 can be generated and automatically input by the user device 102 using the location position sensor 148. Accordingly, the location position sensor 148 can determine the location of the user device 102 and corresponding merchant or third party information relating to that location. The user can also manually input or adjust merchant identification information. The user interface 700 also includes a "Submit Payment" selection 714 selectable by the user to submit the payment to the merchant indicated in the merchant input 712. The user interface 700 additionally includes a "Cancel" selection 716 selectable by the user to cancel the payment transaction. Using the user interface 700, the user can complete a merchant payment using the following steps. First, the user inputs or captures the check amount using the user device 102. Next, the user adjusts and/or adds a tip amount. Then, the merchant identification information is either input by the user or captured by the system. Finally, the user submits the payment and the transaction is completed by the provider computing system 104.

Figure 8:
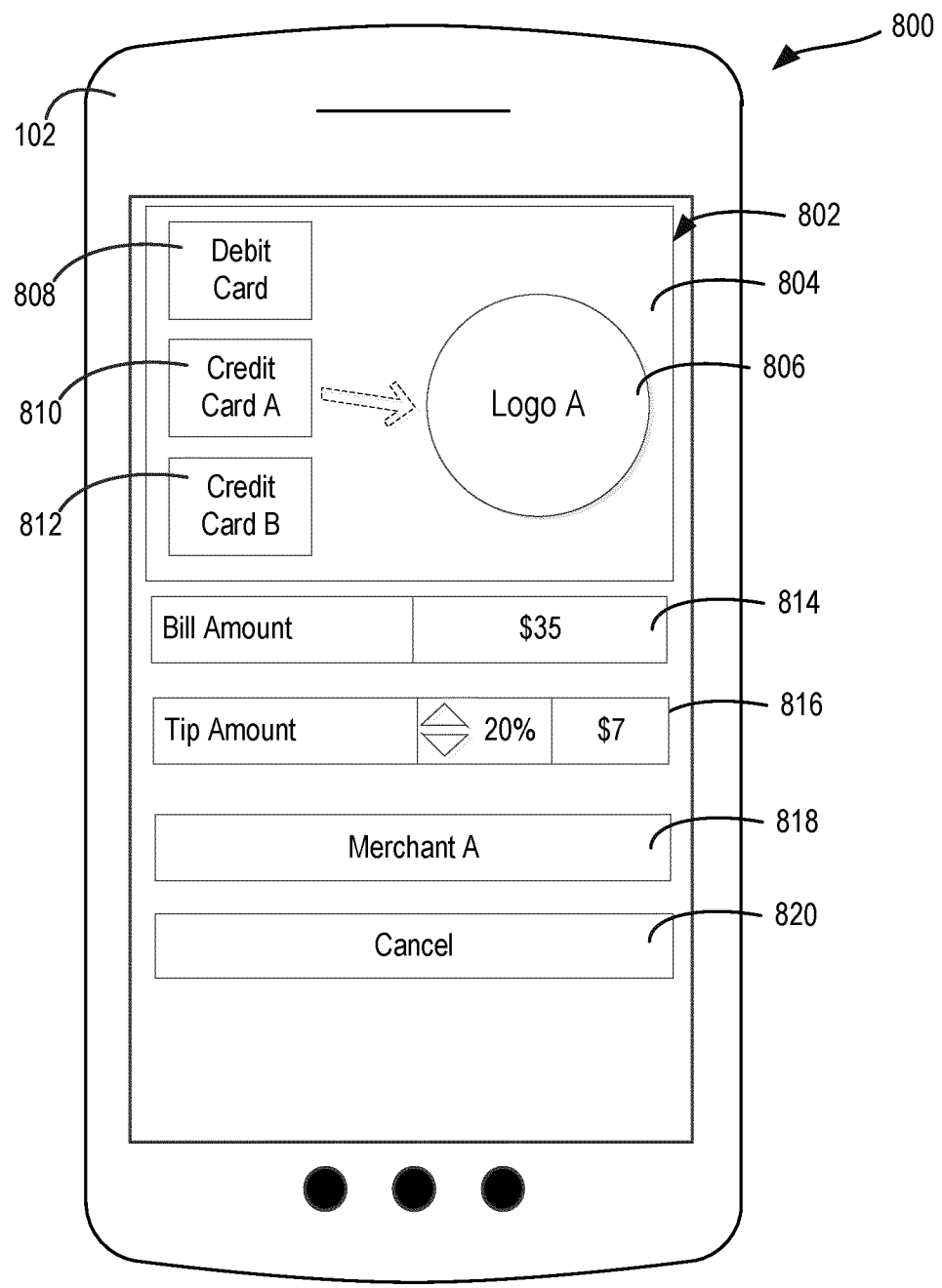
FIG. 8 is an example graphical user interface on the user device of FIG. 1, according to an example embodiment.

Referring now to FIG. 8, an example user interface 800 is shown displayed on user device 102. The user interface 800 can be used to complete a bill payment to a third party. Using the user interface 800 of the user device 102, a user can view a third party logo 806 (e.g., Logo A) through the camera view display 804 (e.g., rear-facing camera view). An overlay can be created that displays the user's various debit or credit cards linked to accounts provided by the provider associated with the provider computing system 104 and/or a third party associated with the third party computing system 106 (e.g., debit card 808, credit card A 810, credit card B 812). Using a swiping motion, the user can swipe from one of the user cards to the logo to make a payment from that account to the third party identified by the logo.

The user interface 800 also includes a bill amount input 814 and a tip amount input 816. The user can either input the bill amount into the bill amount input 814 or the user device 102 and/or provider computing system 104 can automatically determine the bill amount to and enter the amount into the bill amount input 708. Similarly, the user can input the tip amount into the tip amount input 816 or the user device 102 may automatically default to a certain tip amount based on the bill amount. In some cases, if the bill to be paid is a utility bill, mortgage bill, etc., no tip amount may be shown.

The user interface 800 also includes a third party input 818. The third party input 818 is automatically determined from recognizing the logo captured by the camera (e.g., via interfacing with third party computing system 106, retrieving stored information in the accounts database 124, etc.) The user interface 800 also includes a "Cancel" selection 816 selectable by the user to cancel the payment transaction. Using the user interface 800, the user can complete a bill payment using the following steps. First, the user captures a logo of the third party. Next, the user either inputs the bill amount or the bill amount is determined by the system. Then, the user swipes from one of his accounts overlaid onto the user interface 800 to the logo of the third party to complete the payment.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
    viewing a first user through a first camera input of a two-way camera device of a user device, a first user image displayed on a first rendered section of a display interface having a split-screen of the user device;
    viewing a second user through a second camera input of the two-way camera device, a second user image displayed on a second rendered section of the split-screen of the user device;
    receiving, via one of the first camera input or the second camera input, a payment amount of a bill;
    detecting, via a position sensor, a location of the first user and the second user;
    responsive to detecting the location, mining historical data of the user device to identify a correlation between the location, the first user, and the second user;
    determining a recommended division of the payment amount of the bill based on the identified correlation;
    identifying a first coordinate on a touchscreen of the display interface corresponding to a first percentage of the payment amount owed by the first user image displayed on the display interface and a second coordinate on the touchscreen corresponding to a second percentage of the payment amount owed by the second user image displayed on the display interface;
    receiving, via a manual input to one of the first coordinate or the second coordinate, an indication of an update to one of the first percentage of the payment owed by the first user or the second percentage of the payment amount owed by the second user, the update to one of the first percentage owed by the first user or the second percentage owed by the second user corresponding to the recommended division of the bill;
    detecting press of a user input member on the touchscreen at a payment submission input on the display interfce; and
    in response to detecting the press of the user input member at the payment submission input, initiating a transfer of funds from a first user account associated with the first user equal to the first percentage of the payment amount owed of the first user and from a second user account associated with the second user equal to the second percentage of the payment amount owed of the second user.

2. The method of claim 1, further comprising identifying and authenticating the first user and the second user based on facial recognition of the first user image and the second user image.

3. The method of claim 2, further comprising secondarily authenticating at least one of the first user and the second user based on a fingerprint scan received via the press of the user input member.

4. The method of claim 1, further comprising receiving a transaction confirmation message and displaying the transaction confirmation message on the display interface.

5. A user device, comprising:
    a touchscreen including a display interface having a split-screen, the split-screen comprising a first rendering of a first section and a second rendering of a second section;
    a two-way camera; and
    a client application, the client application structured to:
        provide a first view of a first user through a first camera input of the two-way camera device, a first user image displayed on the first section of the split-screen;
        provide a second view of a second user through a second camera input of the two-way camera device, a second user image displayed on the second section of the split-screen;

receive, via one of the first camera input or the second camera input, a transaction payment amount input of a bill;

detect, via a position sensor, a location of the first user and the second user;

responsive to detecting the location, mine historical data of the user device to identify a correlation between the location, the first user, and the second user;

determine a recommended division of the payment amount of the bill based on the identified correlation;

identify a first coordinate on the touchscreen corresponding to a first percentage of the payment amount owed by the first user displayed on the display interface and a second coordinate on the touchscreen corresponding to a second percentage of the payment amount owed by the second user displayed on the display interface;

receive, via a manual input to one of the first coordinate or the second coordinate, an indication of an update to one of the first percentage of the payment owed by the first user or the second percentage of the payment amount owed by the second user, the update to one of the first percentage owed by the first user or the second percentage owed by the second user corresponding to the recommended division of the bill;

detect a press of a user input member on the touchscreen at a payment submission input on the display interface; and in response to detecting the press of the user input member at the payment submission input, initiate a transfer of funds from a first user account associated with the first user equal to the first percentage of the payment amount owed of the first user and from a second user account associated with the second user equal to the second percentage of the payment amount owed of the second user.

6. The user device of claim 5, wherein the client application is further configured to identify and authenticate the first user and the second user based on facial recognition of the first user image and the second user image.

7. The user device of claim 6, wherein the client application is further configured to secondarily authenticating at least one of the first user and the second user based on a fingerprint scan received via the press of the user input member.

8. The user device of claim 5, wherein the client application is further configured to receive a transaction confirmation message and display the transaction confirmation message on the display interface.

9. A non-transitory computer-readable media having computer-executable instructions embodied therein that, when executed by a processor of a user device, cause the user device to perform operations comprising:

provide a first view of a first user through a first camera input of a two-way camera device of the user device, a first user image displayed on a first rendered section of a display interface of the user device;

provide a second view of a second user through a second camera input of the two-way camera device, a second user image displayed on a second rendered section of the split-screen of the user device;

receive, via one of the first camera input or the second camera input, a payment amount of a bill;

detect, via a position sensor, a location of the first user and the second user;

responsive to detecting the location, mine historical data of the user device to identify a correlation between the location, the first user, and the second user;

determine a recommended division of the payment amount of the bill based on the identified correlation;

identify a first coordinate on a touchscreen of the display interface corresponding to a first percentage of the payment amount owed by the first user image displayed on the display interface and a second coordinate on the touchscreen corresponding to a second percentage of the payment amount owed by the second user displayed on the display interface;

receive, via a manual input to one of the first coordinate or the second coordinate, an indication of an update to one of the first percentage of the payment owed by the first user or the second percentage of the payment amount owed by the second user, the update to one of the first percentage owed by the first user or the second percentage owed by the second user corresponding to the recommended division of the bill;

detect a press of a user input member on the touchscreen at a payment submission input on the display interface; and in response to detecting the press of the user input member at the payment submission input, initiate a transfer of funds from a first user account associated with the first user equal to the first percentage of the payment amount owed of the first user and from a second user account associated with the second user equal to the second percentage of the payment amount owed of the second user.

10. The non-transitory computer-readable media of claim 9, wherein the computer-executable instructions, when executed by at least one processor of the user device, cause the user device to identify and authenticate the first user and the second user based on a facial recognition logic applied to the first user image and the second user image.

11. The non-transitory computer-readable media of claim 10, wherein the computer-executable instructions, when executed by at least one processor of the user device, cause the user device to determine a second authentication based on a fingerprint scan of at least one of the first user and the second user, the fingerprint scan received via the press of the user input member.

12. The non-transitory computer-readable media of claim 9, wherein the computer-executable instructions, when executed by at least one processor of the user device, cause the user device to receive a transaction confirmation message and display the transaction confirmation message on the display interface of the user device.

13. The method of claim 1, wherein receiving the transaction payment amount input comprises scanning the bill via the first camera input or the second camera input.

14. The method of claim 1, wherein the manual input to one of the first coordinate or the second coordinate comprises a manual input to one of a slide bar or a dialogue box.

15. The method of claim 14, further comprising updating the other one of the slide bar or the dialogue box responsive to the manual input.

16. The user device of claim 5, wherein receiving the transaction payment amount input comprises scanning the bill via the first camera input or the second camera input.

17. The user device of claim 5, wherein the manual input to one of the first coordinate or the second coordinate comprises a manual input to one of a slide bar or a dialogue box and wherein the client application is further configured to update the other one of the slide bar or the dialogue box responsive to the manual input.

18. The non-transitory computer-readable media of claim 9, wherein the payment amount input is received by scanning the bill via the first camera input or the second camera input of the user device.

19. The non-transitory computer-readable media of claim 9, wherein the manual input to one of the first coordinate or the second coordinate comprises a manual input to one of a slide bar or a dialogue box.

20. The non-transitory computer-readable media of claim 19, wherein the computer-executable instructions, when executed by at least one processor of the user device, cause the user device to update the other one of the slide bar or the dialogue box responsive to the manual input.

* * * * *